US012122049B1

(12) United States Patent
Ivanov

(10) Patent No.: US 12,122,049 B1
(45) Date of Patent: Oct. 22, 2024

(54) TASK-SPECIFIC SIMULATED ROBOTIC MANIPULATORS

(71) Applicant: Amazon Technologies, Inc., Seattle, WA (US)

(72) Inventor: Yuri Anatoly Ivanov, Arlington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 17/832,036

(22) Filed: Jun. 3, 2022

(51) Int. Cl.
*B25J 9/16* (2006.01)
*B25J 9/08* (2006.01)

(52) U.S. Cl.
CPC ............. *B25J 9/1605* (2013.01); *B25J 9/08* (2013.01); *B25J 9/1653* (2013.01); *B25J 9/1664* (2013.01)

(58) Field of Classification Search
CPC ......... A61B 34/20; A61B 34/70; A61B 34/37; A61B 34/32; A61B 17/16; A61B 34/30; A61B 34/76; A61B 18/148; A61B 17/1626; A61B 2018/00565; A61B 2034/107; A61B 2018/00601; A61B 2090/066; A61B 2034/2046; B25J 13/00; B25J 9/1633; B25J 9/1605; B25J 9/1653; B25J 9/1664; B25J 13/085; B25J 9/009; G16H 40/63; G05B 2219/40191; G05B 2219/45117
See application file for complete search history.

(56) References Cited

U.S. PATENT DOCUMENTS 8,153,943 B2 * 4/2012 Nelson .................... F41F 3/04
    342/60
2023/0123322 A1 * 4/2023 Cella .................. G06Q 30/0202
    700/29
(Continued)

OTHER PUBLICATIONS

Wojtynek et al., Assisted Planning and Setup of Collaborative Robot Applications in Modular Production Systems, 2020, IEEE, p. 387-394 (Year: 2020).*
(Continued)

*Primary Examiner* — McDieunel Marc
(74) *Attorney, Agent, or Firm* — Kilpatrick Townsend & Stockton LLP

(57) ABSTRACT

Described herein is a computer-implemented method for generating a task-specific simulated robotic manipulator. A computing device receives, via a robotic design user interface, at least one of task information or constraint information. The computing device selects a set of components for a simulated robotic manipulator from a plurality of components in accordance with at least one of the task information or the constraint information. The computing device generates geometric, kinematic, and/or dynamic information corresponding to the set of components. The geometric, kinematic, and/or dynamic information identifies, for individual components of the set of components, one or more properties. The computing device generates a simulated representation of the simulated robotic manipulator based at least in part on set of components and the geometric, kinematic, and/or dynamic information. The computing device provides, for presentation via a display portion of the robotic design user interface, the simulated representation of the simulated robotic manipulator.

20 Claims, 9 Drawing Sheets

(56) References Cited

U.S. PATENT DOCUMENTS

| | | | |
|---|---|---|---|
| 2023/0222531 A1* | 7/2023 | Cella ................ | G06Q 10/06315 |
| | | | 705/7.31 |
| 2023/0244981 A1* | 8/2023 | Cella ................ | G06Q 10/06315 |
| | | | 706/12 |
| 2023/0245156 A1* | 8/2023 | Cella ...................... | G06N 5/043 |
| | | | 705/7.35 |
| 2024/0118702 A1* | 4/2024 | Cella ...................... | G06Q 10/06 |
| 2024/0144103 A1* | 5/2024 | Cella ...................... | G06Q 50/04 |

OTHER PUBLICATIONS

Brunner et al., Task directed programming of sensor based robots, 1994, IEEE, p. 1080-1087 (Year: 1994).*

Tikhanoff et al., Integration of Speech and Action in Humanoid Robots: iCub Simulation Experiments, 2010, IEEE, p. 17-29 (Year: 2010).*

Luh et al., Animated simulation of human-robot coordination with alternative voice command, 2001, IEEE, p. 332-337 (Year: 2001).*

Patel et al., Using task descriptions for designing optimal task specific manipulators, 2015, IEEE, p. 3544-3551 (Year: 2015).*

Sarha et al., Task and Motion Planning for Manipulator Arms With Metric Temporal Logic Specifications, 2018, IEEE, p. 379-386 (Year: 2018).*

Leibrandt et al., Implicit active constraints for a compliant surgical manipulator, 2014, IEEE, p. 276-283 (Year: 2014).*

Kawamura et al., Pilot study on verification of effectiveness on operability of assistance system for robotic tele-surgery using simulation, 2010, IEEE, p. 2308-2312 (Year: 2010).*

\* cited by examiner

TASK-SPECIFIC SIMULATED ROBOTIC MANIPULATORS

BACKGROUND

Many modern-day industries are relying more and more on robotic manipulators. Such robotic manipulators may function to increase repeatability of tasks, increase efficiency of production lines, and bring other benefits to their operators. Conventionally, robotic manipulators manufacturers, especially those that develop robotic arms, offer fixed sizes of robotic arms, leaving little room for customization. This can result in an operator having to pick an oversized, overpowered, and/or otherwise suboptimal robotic arm to perform certain tasks. For example, a task that requires a long reach, may require an operator to select a robotic arm capable of picking up a refrigerator, even though the task requires a much lower payload value (e.g., 5 lbs). This is because there is not an option for a lower-payload rating that can also meet the reach requirement. Thus, the conventional approach can lead to suboptimal implementations.

BRIEF DESCRIPTION OF THE DRAWINGS

Various embodiments in accordance with the present disclosure will be described with reference to the drawings, in which.

DETAILED DESCRIPTION

Figure 1:
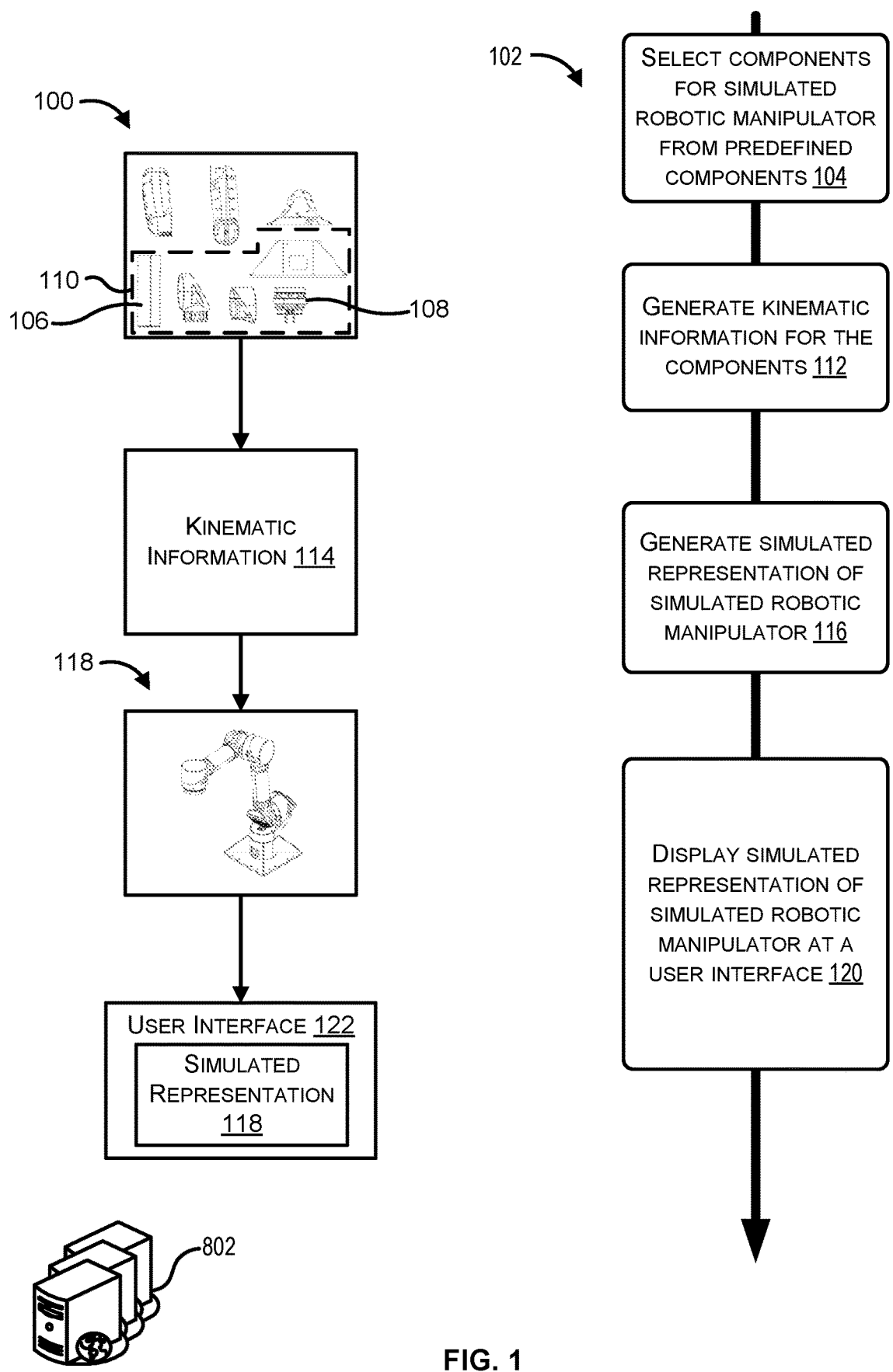
FIG. 1 illustrates an example block diagram and associated flowchart showing a process for implementing techniques relating to generating task-specific simulated robotic manipulators, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, techniques for generating task-specific simulated robotic manipulators. A computing device can perform operations relating to generating a simulated robotic manipulator that can be presented at a user interface of a user device. In an example, the computing device can receive, via the user interface, task information or constraint information related to a robotic manipulation task. The computing device can select a set of components for the simulated robotic manipulator from predefined components in accordance with at least one of the task information or the constraint information. The computing device can then generate geometric, kinematic, and dynamic information corresponding to the set of components, in which the geometric, kinematic, and dynamic information identifies one or more properties for individual components of the set of components. A simulated representation of the simulated robotic manipulator can be generated based on the set of components and the geometric, kinematic, and/or dynamic information. Then, the computing device can provide the simulated robotic manipulator for presentation via a display portion of the user interface. The computing device may also receive modifications for the task information or the geometric, kinematic, and/or dynamic information and update the simulated representation accordingly.

Conventional robotic manipulators are often constructed from predefined, stock components that cannot be altered. So, robotic manipulators may be constructed so that they perform a few tasks sub-optimally, based on the available components. But, aspects of the present disclosure involve selecting some components from a fixed set and customizing other components so that the simulated robotic manipulator is customized specifically for a particular task. For example, actuators for the simulated robotic manipulator may be selected from a predefined set of different sized actuators, but the properties (e.g., length, mass, orientation, etc.) of links between the actuators can be modified for the task. In addition, the combination of links and actuators can be open-ended to meet particular design objectives. Thus, the simulated robotic manipulators can be optimized for a task, resulting in improved execution of the task.

In a particular example, a computing device, such as a webserver, a personal computing device, a tablet computer, a smartphone, or the like, can receive task information and task constraints. The task information can define robotic manipulation tasks, such as moving items a particular distance from a first location to a second location. The task constraints can correspond to the robotic manipulation tasks, such as indicating that items up to 50 kg are to be moved during the robotic manipulation task. The computing device can then select a set of components from predefined components that, when assembled, can perform the robotic manipulation task in accordance with the constraint. While the components are selected from a set of fixed components, such as a few sizes of actuators and links, the combination of the selected components (e.g., their sizes, order, orientation, etc.) and certain properties of the components (e.g., length of links, range of rotation, etc.) can be changed to provide ultimate flexibility and optimization for a specific task. In addition, the actuators throughout the simulated robotic manipulator and the link sizes throughout the robotic manipulator can be different. As an example, the computing device may select two actuators of different sizes and two links with a same diameter but different links. This combination of properties for the actuators and the links can be determined to be satisfactory for moving the items. The computing device can generate a simulated representation of a simulated robotic manipulator that includes the two actuators and the two links, and can provide the simulated representation for presentation at a user interface. The simulated representation can then be evaluated and modified until the simulated robotic manipulator is determined to optimally perform the robotic manipulation task. A bill of materials for constructing a real robotic manipulator that corresponds to the simulated robotic manipulator can then be generated by the computing device.

Turning now to the figures, FIG. 1 illustrates an example block diagram and associated flowchart showing a process 102 for implementing techniques relating to generating task-specific simulated robotic manipulators, according to at least one example.

The block diagram depicts devices, objects, and the like that correspond to the process 102. The process 102 can be performed by any suitable combination of hardware and/or software, as described herein.

FIGS. 1-3 and 7 illustrate example flow diagrams showing respective processes 102, 200, 300, and 700, as described herein. The processes 102, 200, 300, and 700, are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

A simulated robotic manipulation generation engine 810 (FIG. 8) embodied in a computer system 802 (FIG. 8) and/or within a user device 804 (FIG. 8) may perform the process 102. Thus, while the description below is from the perspective of the computer system 802, the user device 804 may also perform the process 102 or portions of the process 102.

The process 102 may begin at block 104 by the computer system 802 selecting a set of components 110 for a simulated robotic manipulator from predefined components 100. The set of the components 110 can be selected, for example, based on task requirement information or task constraint information associated with the simulated robotic manipulator. The task requirement information can define one or more robotic manipulation tasks and the task constraint information can define one or more constraints for the robotic manipulation tasks. For instance, the task requirement information can indicate that a task involves a manipulation task of picking items from a first location, moving the items, and placing the items in a second location and the task constraint information can indicate a payload weight value (e.g., 50 lbs) and/or a processing rate value (e.g., 300 items/hr) for the picking, moving, and placing of the items. The task requirement information may additionally identify a maximum reach value, and/or keep-out zones for the robotic manipulation task. The computer system 802 may select the set of components 110, or a user may provide a selection of the set of components 110 via a user interface. In some embodiments, a standard simulated robotic manipulator having the set of components 110 may be selected from among a set of standard simulated robotic manipulators, a standard module included in the set of components 110 may be selected from among a set of standard modules, or a standard component included in the set of components 110 may be selected from among a set of standard components. Modules can be two or more components that can be added together. For instance, a module may include an actuator and a link that is connected to the actuator. Or, each component may be individually selected from the components 100 to generate the set of components 110.

The components 100 can be or include different types of components. For example, the components 100 can include a links 106 of varying sizes and actuators 108 of varying sizes and types, or any suitable type of component. Each type of component 100 can have the same or similar pertinent dimensions (e.g., can be modular components) such that one component of a first type can be replaced by another component of the same type without adjusting the other components 100 of the robotic manipulator. For example, one link 106 can be replaced by link 106 without needing to use any additional connectors or components. In some embodiments, the components of the same type can have different non-pertinent dimensions or features. The non-pertinent dimensions can allow some aspects of the robotic manipulator to be changed without needing to completely disassemble or redesign the robotic manipulator. For example, a link 106 having a first length can be replaced by a link 106 having a second different length because the links 106 have the same diameter (e.g., have the same pertinent dimension).

The set of components 110 can include one or more types of the components 100. The set of components 110 can additionally or alternatively include multiple components of each type or multiple components of any of the types. For example, the set of components 110 can include two links 106 and two actuators 108. The set of components 110 can be combined in one or more ways (e.g., in different orders and/or in different amounts of each type of component) to build the simulated robotic manipulators.

In some embodiments, one or more of the set of components 110 can include electronics (e.g., a controller). The electronics can include information about the set of components 110 and/or the locations of the components in the set of components 110 (e.g., the location of the components in the set of components 110 relative to one another). The electronics can communicate with one another (e.g., via a wired or wireless connection) to communicate information about the set of components 110 and/or to provide electrical power to the set of components 110.

The robotic manipulator may be any suitable material handling equipment (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects).

In some embodiments, depending on the function of the simulated robotic manipulator, the simulated robotic manipulator can include an end effector. The end effector can manipulate various items. For example, the end effector can grasp an item and move the item. Example categories of end effectors include: soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or Ferrofluids (e.g., fluids having suspended Ferro-magnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

The process 102 may continue at block 112 by the computer system 802 generating geometric information (e.g., information relating to a reach of the robotic manipulator), kinematic information (e.g., information relating to robotic morphology and operability of the robotic manipulator), and dynamic information (e.g., information relating to loads, velocities, accelerations, torques, and forces of the robotic manipulator) 114 for the set of components 110. In some examples, the geometric, kinematic, and/or dynamic information 114 can identify one or more properties of each component of the set of components 110. For example, the geometric, kinematic, and/or dynamic information 114 can include properties associated with a position, velocity, acceleration, and/or an orientation of the components 110. The properties may vary depending on the type of component. For instance, for the properties for the link 106 may be different than the properties for the actuator 108. As an example, properties for the link 106 can include a length value, a link mass value, and/or any other suitable property (e.g., a link center of mass value, a link diameter value, etc.), and properties for the actuator 108 can include a size (e.g., from predefined sizes), a torque value, a type identifier (e.g., revolute, prismatic, etc.), an actuator mass value, and/or any other suitable property.

The process 102 may continue at block 116 by the computer system 802 generating a simulated representation 118 of the simulated robotic manipulator. The computer system 802 generates the simulated representation 118 using the set of components 110 and the geometric, kinematic, and/or dynamic information 114. For instance, the simulated representation 118 can include each component of the set of components 110 having the properties of the geometric, kinematic, and/or dynamic information 114. So, the simulated representation 118 can correspond to a simulated robotic manipulator that can perform the robotic manipulation tasks defined in the task requirement information in accordance with the constraints defined in the task constraint information.

The process 102 may continue at block 120 by the computer system 802 displaying the simulated representation 118 of the simulated robotic manipulator at a user interface 122. The computer system 802 can provide the simulated representation 118 for presentation at a display portion of the user interface 122, which can be a robotic design user interface of a user device. Upon determining that the simulated representation 118 of the simulated robotic manipulator corresponds to an optimum configuration of components (for instance by evaluating the simulated representation 118 in accordance with an optimization parameter), the computer system 802 can generate a bill of materials that can be used for validation and/or manufacture of a real robotic manipulator having components that correspond to the set of components 110. Alternatively, if the simulated representation 118 does not optimize the optimization parameter, the computer system 802 can iteratively update the set of components 110 and/or the geometric, kinematic, and/or dynamic information 114 until the optimization parameter is optimized, as further described below. As the set of components 110 and/or the geometric, kinematic, and/or dynamic information 114 is updated, the computer system 802 can automatically update the simulated representation 118 accordingly. In some examples, adding and removing components 110 may be performed using drag-and-drop functionality. Once a new component has been placed, the computer system 802 can automatically update the simulated representation 118, as described herein.

Figure 2:
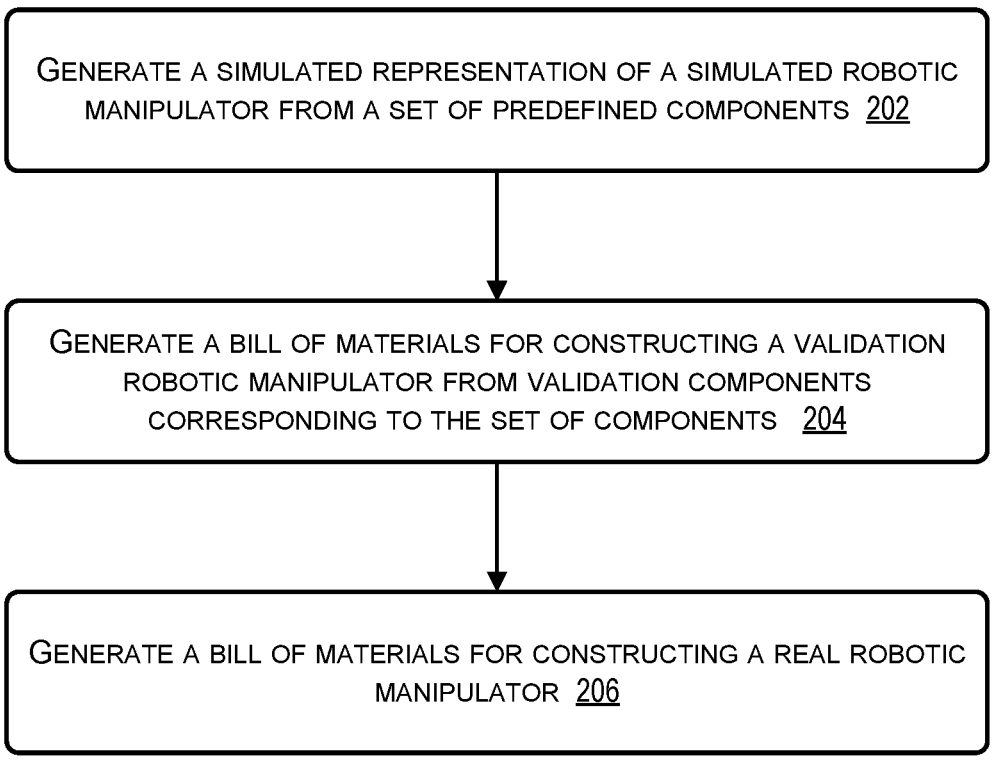
FIG. 2 illustrates an example flowchart showing an overall process of designing, validating, and constructing a task-specific robotic manipulator, according to at least one example.

FIG. 2 illustrates an example flowchart showing an overall process 200 of designing, validating, and constructing a task-specific robotic manipulator, according to at least one example. The simulated robotic manipulation generation engine 810 (FIG. 8) embodied in the computer system 802 (FIG. 8) and/or within the user device 804 (FIG. 8) may perform the process 200. Thus, while the description below is from the perspective of the computer system 802, the user device 804 may also perform the process 200 or portions of the process 200.

The process 200 may begin at block 202 by the computer system 802 generating a simulated representation of a simulated robotic manipulator using a set of predefined components. As previously described, the computer system 802 can receive task requirement information and task constraint information for the simulated robotic manipulator. Based on the task requirement information and the task constraint information, the computer system 802 can select the set of components (e.g., set of components 110 in FIG. 1) for the simulated robotic manipulator to perform robotic manipulation tasks in accordance with the task requirement information an in accordance with the task constraints. The computer system 802 can then generate geometric, kinematic, and/or dynamic information (e.g., the information 114 in FIG. 1) for the set of components to identify properties for each component of the set of components. Using the set of components and the geometric, kinematic, and/or dynamic information, the computer system 802 can generate the simulated representation of the simulated robotic manipulator.

The process 200 may continue at block 204 by the computer system 802 generating a bill of materials for constructing a validation robotic manipulator from validation components corresponding to the set of components. The validation components can be robotic manipulator components that are repeatedly used to validate various robotic manipulators after generating the simulated representation of the simulated robotic manipulator and before generating a real robotic manipulator for use. So, there can be a predefined set of validation components, and the computer system 802 can include validation components that correspond to the set of components of the simulated robotic manipulator in the bill of materials. The computer system 802 can output the bill of materials to an operator who can use the bill of materials to construct the validation robotic manipulator, test that the validation robotic manipulator performs the robotic manipulation tasks as expected, and then provide feedback to the computer system 802. The validation components may include some level of configurability. For instance, it may be easy to switch links, adjust actuators, change length of links, etc. for the validation components. If the feedback indicates that the validation robotic manipulator does not perform satisfactorily, the computer system 802 can adjust the set of components and/or the geometric, kinematic, and/or dynamic information to generate a new simulated representation of the simulated robotic manipulator. Once updated, the computer system 802 can generate another bill of materials for a second validation robotic manipulator that the operator can use to construct the second validation robotic manipulator.

The process 200 may continue at block 206 by the computer system 802 generating a bill of materials for constructing a real robotic manipulator. Upon determining that the validation robotic manipulator performs the robotic manipulation tasks satisfactorily, the computer system 802 can generate the bill of materials to include the set of components and the geometric, kinematic, and/or dynamic information of the simulated representation of the simulated robotic manipulator (and the validation robotic manipulator). The computer system 802 can output the bill of materials to the operator who can use the bill of materials to construct the real robotic manipulator. The real components have the determined properties and can be designed for easy assembly. That is, the real components may be designed such that they only fit together in one configuration so that they cannot be assembled incorrectly. Because the set of components have been simulated and validated, the real robotic manipulator may only be constructed after testing the expected performance of the set of components, which can reduce manufacturing requirements for the real robotic manipulator.

Figure 3:
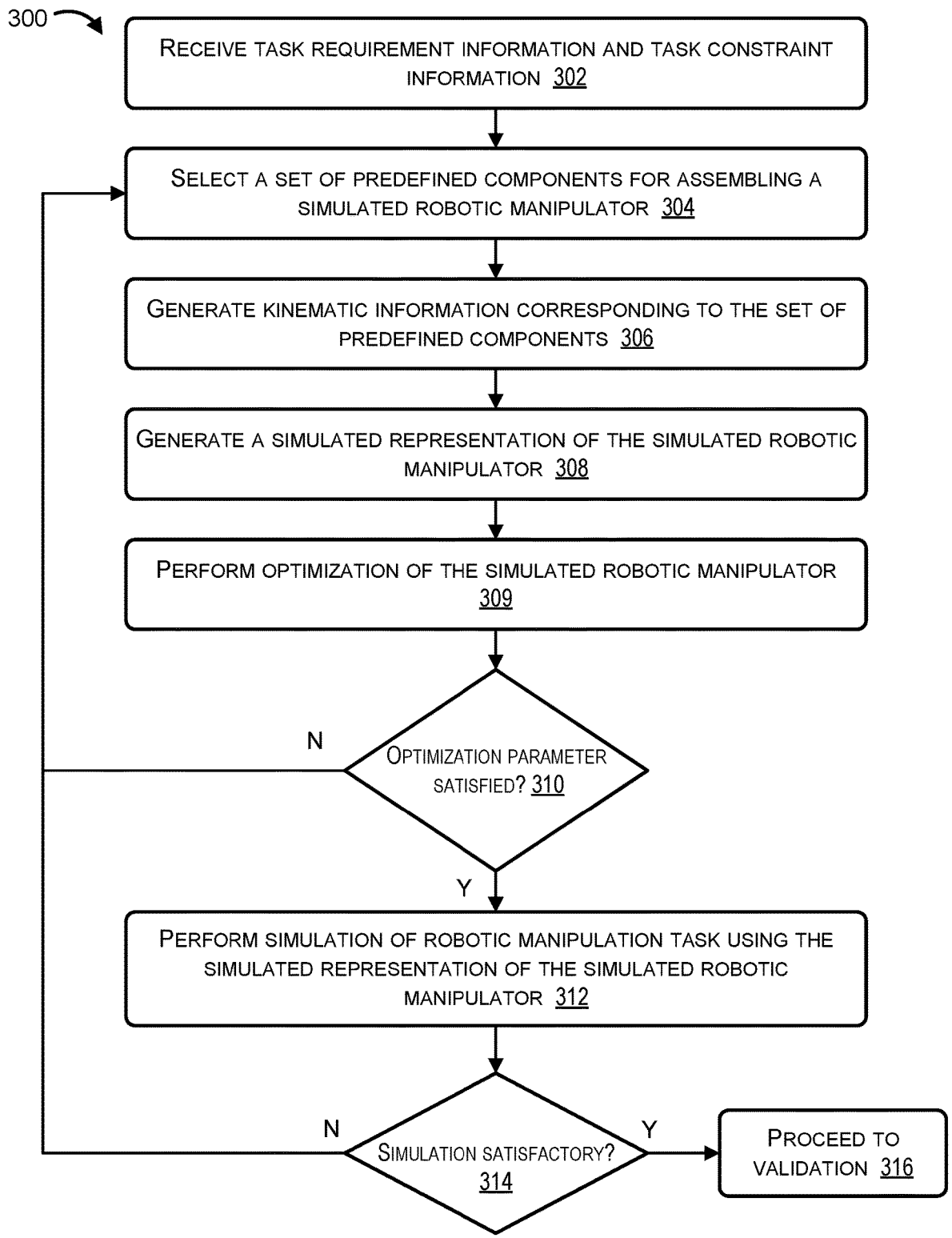
FIG. 3 illustrates an example flowchart showing a process of iteratively designing a task-specific simulated robotic manipulator, according to at least one example.

FIG. 3 illustrates an example flowchart showing a process 300 of iteratively designing a task-specific simulated robotic manipulator, according to at least one example. The simulated robotic manipulation generation engine 810 (FIG. 8) embodied in the computer system 802 (FIG. 8) and/or within the user device 804 (FIG. 8) may perform the process 300. Thus, while the description below is from the perspective of the computer system 802, the user device 804 may also perform the process 300 or portions of the process 300.

The process 300 may begin at block 302 by the computer system 802 receiving task requirement information and task constraint information. The task requirement information defines robotic manipulation tasks, such as identifying a maximum reach value, a manipulation task, and/or any other suitable task requirement (e.g., a number of items to sequentially manipulate, locations of objects to be avoided, etc.). The task constraint information defines constraints corresponding to the robotic manipulation tasks, such as identifying a payload weight value, an acceleration value, a processing rate value, and/or any other suitable task constraint (e.g., time length for performing the task, cost for performing the task, etc.).

The process 300 may continue at block 304 by the computer system 802 selecting a set of predefined components (e.g., set of components 110 in FIG. 1) for assembling a simulated robotic manipulator. The set of predefined components can be selected based on the task requirement information and/or the task constraint information. For instance, the computer system 802 may select a particular link to be included in the set of predefined components based on the task requirement information indicating that the robotic manipulation task involves a particular maximum reach value.

The process 300 may continue at block 306 by the computer system 802 generating geometric, kinematic, and/or dynamic information (e.g., the information 114 in FIG. 1) corresponding to the set of predefined components. The geometric, kinematic, and/or dynamic information identifies properties of each component of the set of components. The properties may vary depending on the type of component. For instance, the properties for a link may be different than the properties for an actuator. As an example, properties for a link can include a link geometry, a link mass value, and/or any other suitable property (e.g., a link center of mass value, a link diameter value, etc.), and properties for an actuator can include a size, an actuator geometry, a torque value, a force value, a velocity value, a type identifier, an actuator mass value, and/or any other suitable property.

The process 300 may continue at block 308 by the computer system 802 generating a simulated representation (e.g., simulated representation 118 in FIG. 1) of the simulated robotic manipulator. The computer system 802 generates the simulated representation using the set of predefined components and the geometric, kinematic, and/or dynamic information. So, the simulated representation can include each component of the set of predefined components having the properties of the geometric, kinematic, and/or dynamic information. As a result, the simulated representation can correspond to a simulated robotic manipulator that can perform the robotic manipulation tasks defined in the task requirement information in accordance with the constraints defined in the task constraint information.

The process 300 may continue at block 309 by the computer system performing an optimization for the simulated robotic manipulator. The computer system 802 may execute an optimization model based on the simulated robotic manipulator, the task requirement information, the task constraint information, and the geometric, kinematic, and/or dynamic information. The optimization model can be based on an optimization parameter, which can be a cost parameter, a safety parameter, a task rate parameter, and/or any other suitable parameter (e.g., a time parameter, a manipulation accuracy parameter, etc.). The task rate is a speed associated with performing the task. The safety optimization can ensure that if a real robotic manipulator that corresponds to the simulated robotic manipulator is constructed, an operator in the vicinity of the real robotic manipulator may be out of reach from being hit by the real robotic manipulator during the robotic manipulation tasks.

The process 300 may continue at block 310 by the computer system 802 determining whether an optimization parameter is satisfied (e.g., minimized or below a threshold). The optimization parameter may correspond to the optimization performed at block 309. So, the computer system 802 can evaluate the simulated robotic manipulator in accordance with cost optimization, energy consumption optimization, work envelope optimization, actuator torque optimization, safety optimization, task rate optimization, or a combination thereof. If the computer system 802 determines that the optimization parameter is not satisfied, the computer system 802 may determine adjustments for the simulated robotic manipulator that are expected to improve performance of the simulated robotic manipulator. For instance, the computer system 802 may determine a number of actuators, a number of links, types of actuators, lengths of links, torque values for the actuators, a distribution of actuators along the simulated robotic manipulator, rotation directions for the links, ranges of rotation for the links, and/or any other suitable modifications that are expected to improve the performance of the simulated robotic manipulator. The process 300 can then return to block 304 to make the adjustments, either by modifying the set of components or properties of the components. Otherwise, if the computer system 802 determines that the optimization parameter is satisfied, the computer system 802 can proceed to block 312.

The process 300 may continue at block 312 by the computer system 802 performing a simulation of the robotic manipulation task using the simulated robotic manipulator. The computer system 802 may output the simulated representation to a user interface, and the simulation may be performed at the user interface. The simulation can simulate the robotic manipulation task so that the expected performance of the simulated robotic manipulator can be evaluated before a real robotic manipulator is constructed.

The process 300 may continue at block 314 by the computer system 802 determining whether the simulation is satisfactory. There can be benchmarks associated with the robotic manipulation task and the computer system 802 can determine whether the benchmarks are met during the execution of the simulation. For example, the benchmarks may be a number of items able to be manipulated according to the task requirement information in a predefined time window (e.g., a task rate), a weight of items able to be manipulated by the simulated robotic manipulator, an accuracy of a manipulation of items, etc. If the computer system 802 determines that the benchmarks are not met during the simulation, the process 300 can return to block 304 to make adjustments, either by modifying the set of components or properties of the components. Otherwise, if the computer system 802 determines that the simulation is satisfactory, the computer system 802 can proceed to block 316.

The process 300 may continue at block 316 by the computer system 802 proceeding to validation. The computer system 802 can generate a bill of materials for constructing a validation robotic manipulator from validation components corresponding to the set of predefined components. An operation can use the bill of materials to construct the validation robotic manipulator, test that the validation robotic manipulator performs the robotic manipulation tasks as expected, and then provide feedback to the computer system 802 to adjust the set of components or to generate a bill of materials for a real robotic manipulator.

Figure 4:
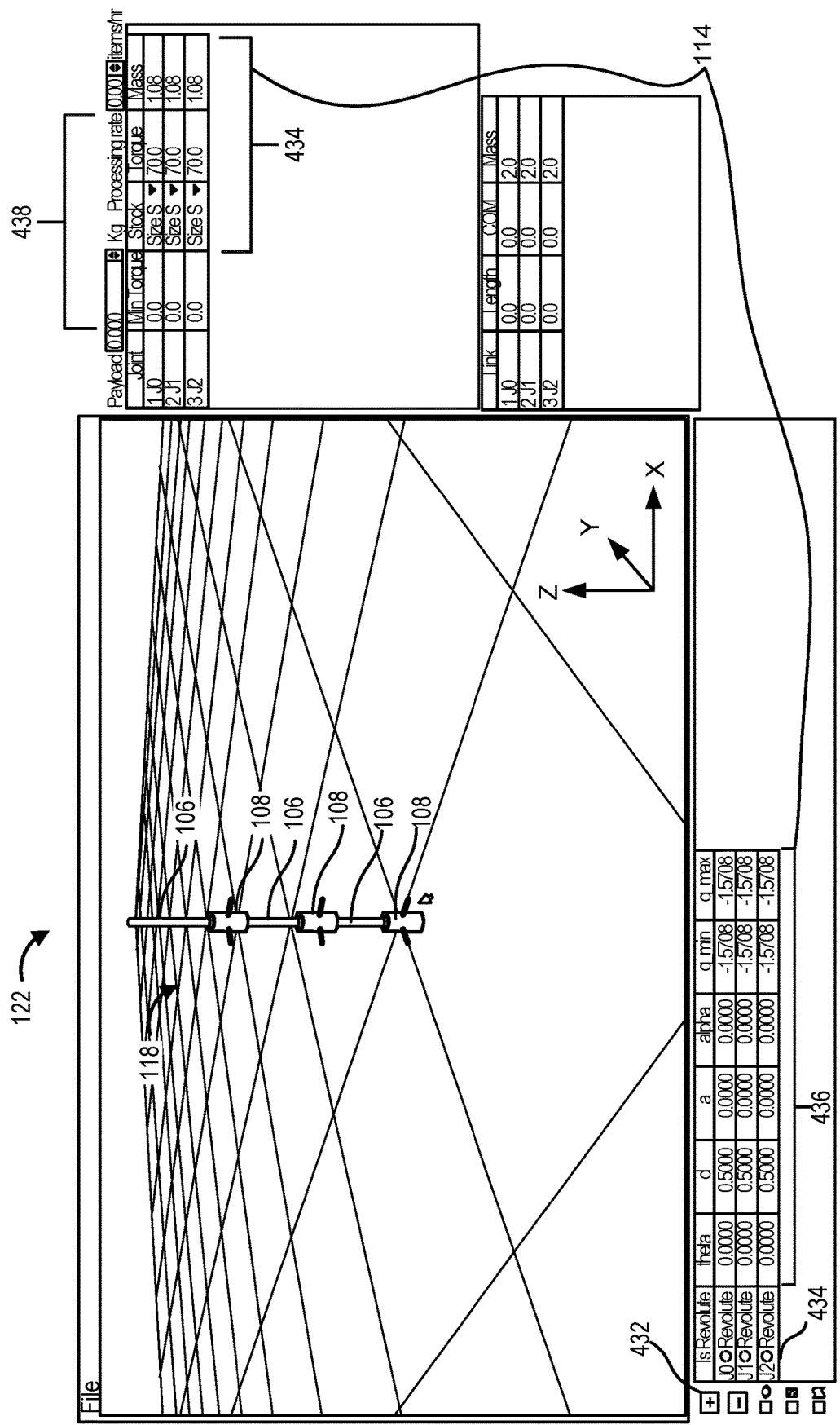
FIG. 4 illustrates an example user interface displaying a simulated representation of a task-specific simulated robotic manipulator, according to at least one example.

FIG. 4 illustrates an example user interface 122 displaying a simulated representation 118 of a task-specific simulated robotic manipulator, according to at least one example. The simulated representation 118 can be generated based on a user selection of components, or may be generated by the computer system 802 (FIG. 8) based on task requirements and task constraints, which are shown in a task requirement panel 438, for the simulated robotic manipulator. The task requirement panel 438 include a payload value and a processing rate value. In some examples, the task requirement panel 438 may include additional values relating to the specific requirements of the particular task for which the robotic manipulator is being designed (e.g., joint acceleration, arm reach, etc.). The set of components, modules, or individual components for the simulated representation 118 may be selected from a standard simulated robotic manipulator that includes the set of components, a standard module included in the set of components, or a standard component included in the set of components, respectively. For instance, the simulated representation 118 includes three links 106 and three actuators 108, which may be a standard simulated robotic manipulator selected by the user or the computer system 802. The user interface 122 can include a component addition user interface element 432. Upon receiving a selection of the component addition user interface element 432, a component can be added to the simulated representation 118. Another component corresponding the first component can also be added. For instance, selecting the component addition user interface element 432 may result in an actuator and a link associated with the actuator to be added to the simulated representation 118.

The user interface 122 also includes a display of geometric, kinematic, and/or dynamic information 114, which includes actuator properties 434 and link properties 436. The actuator properties 434 identify a type, size, torque, and mass of each of the actuators 108. As illustrated, each of the actuators 108 are revolute actuators that are size small, with a maximum torque of 70 N·m and a mass of 1.08 kg. The link properties 436 include a length, a mass, a center of mass, and a range of rotation for each of the links 106. As illustrated, each of the links 106 are 2 kg, and have a range of motion from −1.5708 to −1.5708 radians, so the links are fixed and cannot rotate. The link properties 436 related to orientation and length of the links 106 can be expressed as Denavit-Hartenberg (DH) parameters, which include an offset in the Z-direction from the previous link (d), an angle about the Z-axis of previous link in the X-direction to the position of the next link in the X-direction ($\theta$), a length of the common normal (a), and an angle about the common normal, from the previous Z-axis to the new Z-axis ($\alpha$). As illustrated, each of the links 106 have link properties 436 of 0.5 m for d, and zero for $\theta$, a, and $\alpha$.

The computer system 802 can receive modification instructions for modifying a property of the simulated robotic manipulator. For example, the computer system 802 can receive modification instructions for modifying the geometric, kinematic, and/or dynamic information 114 via the user interface 122. A user may interact with the user interface 122 to select updated geometric, kinematic, and/or dynamic information by modifying the components in the set of components. For instance, the user may select a link having different properties to be added to the set of components or to replace one of the links 106. Alternatively, the computer system 802 may evaluate the simulated robotic manipulator in accordance with an optimization parameter and modify the set of components to improve the evaluation. Based on the updated geometric, kinematic, and/or dynamic information 114, the computer system 802 can update the simulated representation 118 and provide the updated simulated representation for presentation via the display portion of the user interface 122.

In some examples, the computer system 802 can receive updated task information via the user interface 122. A user may provide the updated task information to the computer system 802. For instance, the user may indicate that a maximum reach value for a robotic manipulation task that is to be performed by the simulated robotic manipulator has increased. Based on the updated task information, the computer system 802 can update the simulated representation 118 and provide the updated simulated representation for presentation via the display portion of the user interface 122.

Figure 5:
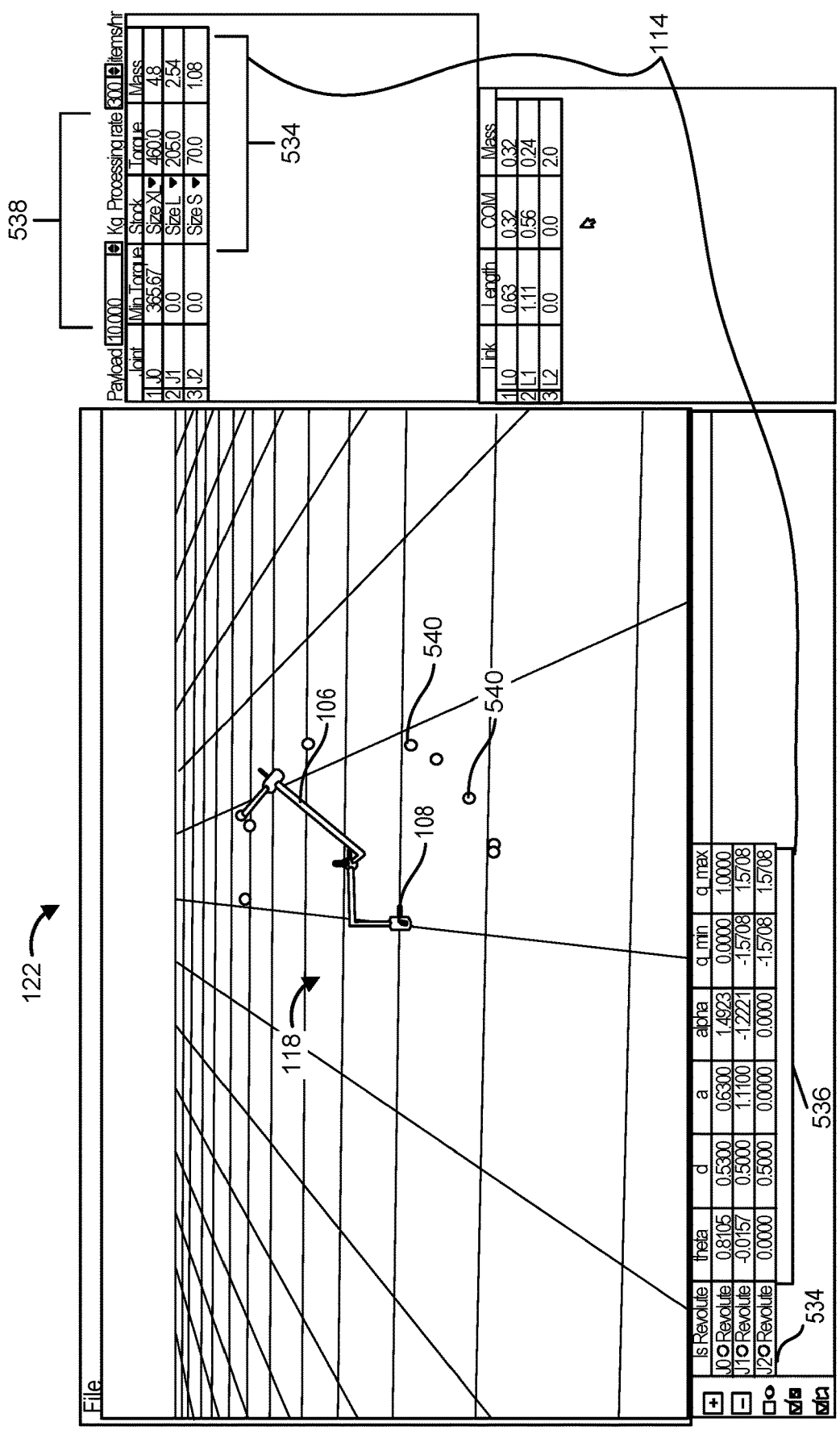
FIG. 5 illustrates an example user interface displaying a simulated representation of a task-specific simulated robotic manipulator with task waypoints, according to at least one example.

FIG. 5 illustrates an example user interface displaying a simulated representation 118 of a task-specific simulated robotic manipulator with task waypoints 540, according to at least one example. The simulated representation 118 can be generated based on a user selection of components, or may be generated by the computer system 802 (FIG. 8) based on task requirements and task constraints, shown in a task requirement panel 538, for the simulated robotic manipulator. Similar to FIG. 4, the simulated representation 118 of the simulated robotic manipulator includes three links 106 and three actuators 108. Actuator properties 534 and link properties 536 identify geometric, kinematic, and/or dynamic information 114 of the actuators 108 and links 106, respectively. In addition, the task requirement panel 538 indicates that a robotic manipulation task for the simulated robotic manipulator involves manipulating items that are up to 10 kg with a processing rate of 300 items/hr.

The user interface 122 in FIG. 5 also displays the task waypoints 540 that can be determined by the computer system 802 based on the geometric, kinematic, and/or dynamic information 114. The task waypoints 540 are points that the simulated representation 118 can simulate movements between (e.g., represent a location in three-dimensional space) and may include an orientation for defining a pose of the simulated representation 118 (e.g., define the pose in terms of three rotation angles). So, the task waypoints 540 are generally associated with six degrees of freedom. The computer system 802 may determine waypoints and/or orientations of the waypoints that the simulated robotic manipulator can reach based on the geometric, kinematic, and/or dynamic information 114 and generate the task waypoints 540 based on the waypoints. Or, a user may provide a selection of the task waypoints 540 on the user interface 122 to evaluate whether the simulated robotic manipulator can reach between the task waypoints 540. Alternatively, the computer system 802 may determine the set of task waypoints 540 based on the task information, which can indicate a maximum reach value for the simulated robotic manipulator. Once the task waypoints 540 are provided for display at the user interface 122, the computer system 802 can plan and optimize trajectories between the task waypoints to execute necessary motions and cause the simulated representation 118 to simulate movements between individual task waypoints 540 of the set of task waypoints 540. If the computer system 802 determines that the simulated representation 118 cannot reach the position or orientation of a task waypoint, the computer system 802 can update the set of planned motion trajectories between task waypoints 540 or the simulated representation 118 until the simulated representation 118 is determined to accurately reach the set of task waypoints 540. Based on an effort associated with the simulated representation 118 moving between the task waypoints 540, the computer system 802 can determine sizes of actuators and links for the simulated representation 118.

Figure 6:
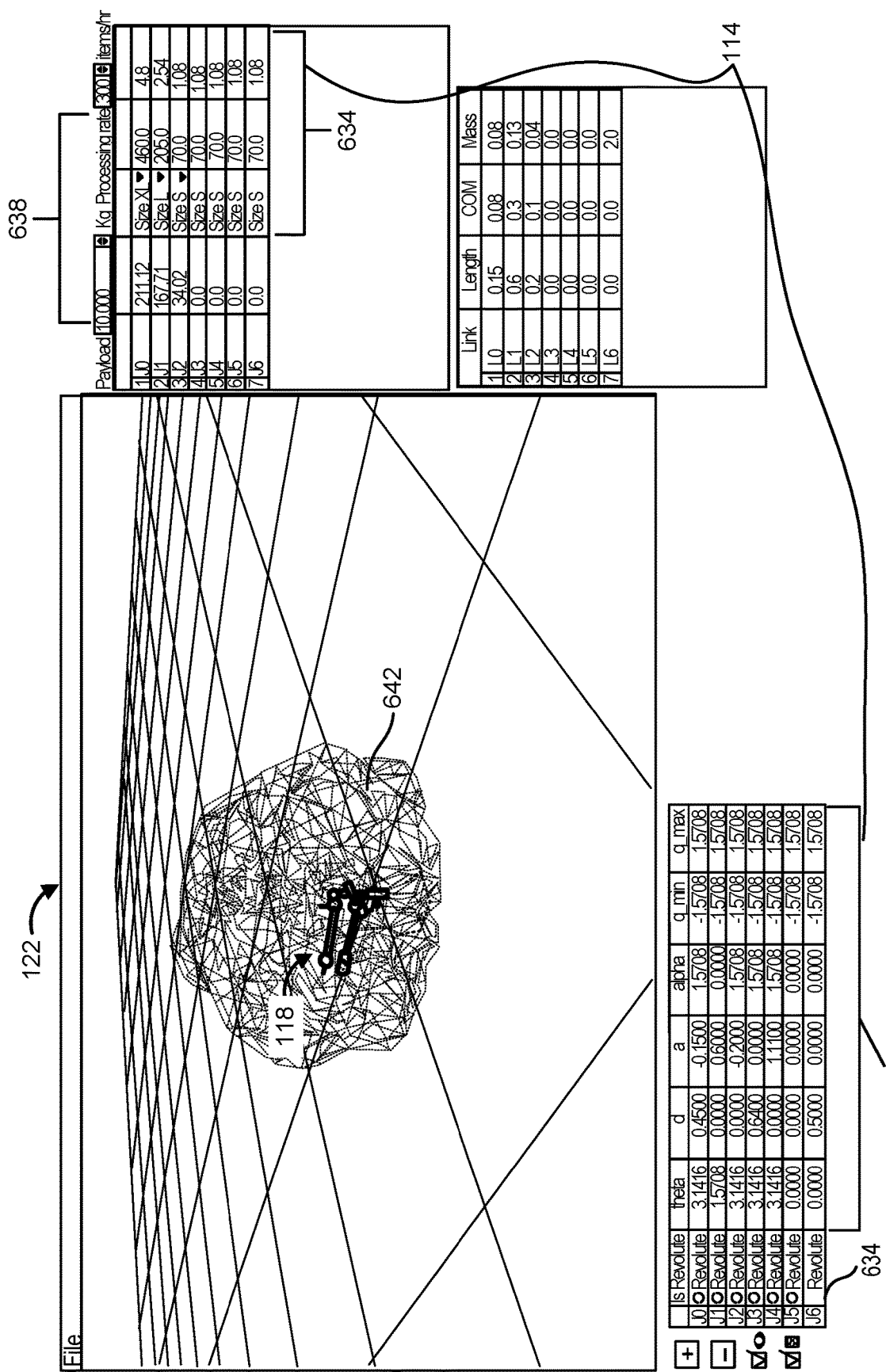
FIG. 6 illustrates an example user interface displaying a simulated representation of a task-specific simulated robotic manipulator with a work envelope, according to at least one example.

FIG. 6 illustrates an example user interface displaying a simulated representation 118 of a task-specific simulated robotic manipulator with a work envelope 642, according to at least one example. The simulated representation 118 can be generated based on a user selection of components, or may be generated by the computer system 802 (FIG. 8) based on task requirements and task constraints, shown in a task requirement panel 638, for the simulated robotic manipulator. The simulated representation 118 of the simulated robotic manipulator in FIG. 6 includes seven links and seven actuators. Actuator properties 634 and link properties 636 identify geometric, kinematic, and/or dynamic information 114 of the actuators and links, respectively. In addition, the task requirement panel 638 indicates that a robotic manipulation task for the simulated robotic manipulator involves manipulating items that are up to 10 kg with a processing rate of 300 items/hr.

In some examples, the computer system 802 can generate the work envelope 642 corresponding to the simulated robotic manipulator based on the geometric, kinematic, and/or dynamic information 114. The work envelope 642 can be a graph illustrating a range of movement of the simulated robotic manipulator. The work envelope 642 can be generated based on the link lengths, the range of rotations of the links, and other properties of the links and actuators. The computer system 802 can provide the work envelope 642 for presentation via the display portion of the user interface 122. In FIG. 6, the work envelope 642 corresponds to a reachability work envelope, which is an area within which the simulated representation 118 can reach any point. The computer system 802 may additionally or alternatively generate a manipulability work envelope, which is an area in which the simulated representation 118 can reach any point in different orientations.

Figure 7:
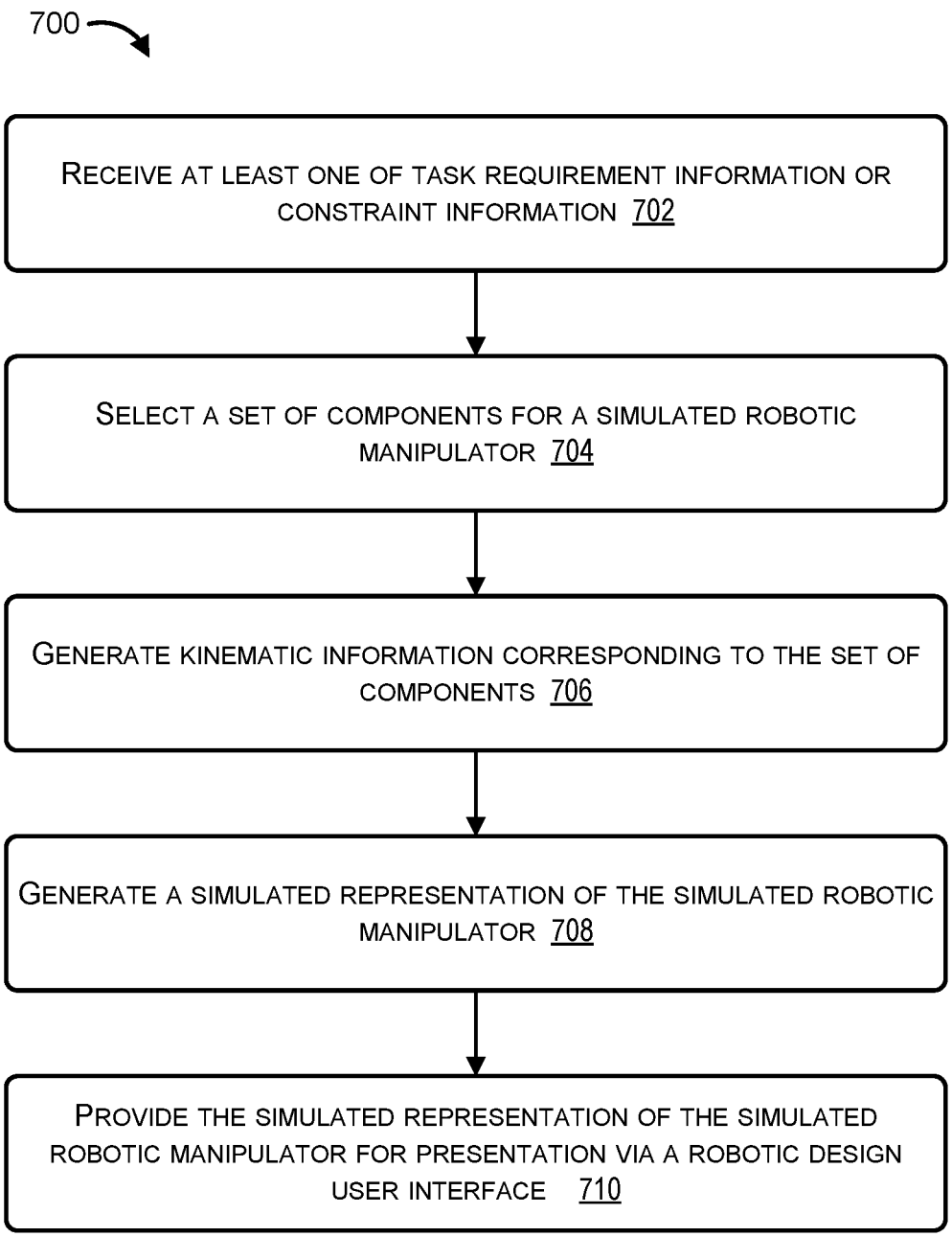
FIG. 7 illustrates an example flowchart showing a process of generating a simulated representation of a task-specific simulated robotic manipulator, according to at least one example.

FIG. 7 illustrates an example flowchart showing a process 700 of generating a task-specific simulated representation (e.g., simulated representation 118 in FIG. 1) of a simulated robotic manipulator, according to at least one example. The simulated robotic manipulation generation engine 810 (FIG. 8) embodied in the computer system 802 (FIG. 8) and/or within the user device 804 (FIG. 8) may perform the process 700. Thus, while the description below is from the perspective of the computer system 802, the user device 804 may also perform the process 700 or portions of the process 700.

The process 700 may begin at block 702 by the computer system 802 receiving at least one of task requirement information or constraint information. The task requirement information defines one or more robotic manipulation tasks and the task constraint information defines one or more constraints corresponding to the one or more robotic manipulation tasks. The task requirement information can identify at least one of a maximum reach value or a manipulation task and the task constraint information can identify at least one of a payload weight value or an acceleration value.

The process 700 may continue at block 704 by the computer system 802 selecting a set of components 110 (FIG. 1) for the simulated robotic manipulator. The set of components 110 can be used for assembling the simulated robotic manipulator in accordance with the one or more constraints. The set of components can be selected from predefined components 100 (FIG. 1) based on the task requirement information and the task constraint information. The set of components 110 may be selected by receiving the set of components 110 via user selection. In addition, selecting the set of components 110 for the simulated robotic manipulator may involve selecting a standard simulated robotic manipulator that includes the set of components 110 from among a set of standard simulated robotic manipulators, selecting a standard module included in the set of components 110 from among a set of standard modules, or selecting a standard component included in the set of components 110 from among a set of standard components. The predefined components 100 can include a set of actuators of varying sizes and types. The set of components 110 can include at least one link 106 (FIG. 1) and at least one actuator 108 (FIG. 1). The computer system 802 can access a component database that stores a set of predefined robotic components including the at least one predefined actuator and the link.

The process 700 may continue at block 706 by the computer system 802 generating geometric, kinematic, and/or dynamic information 114 (FIG. 1) corresponding to the set of components 110. The geometric, kinematic, and/or dynamic information 114 identifies one or more properties for individual components of the set of components 110. The one or more properties can include first properties for a first type of component of the set of components 110 and second properties for a second type of component of the set of components 110, where the first type of component is distinct from the second type of component. For example, the first type of component can be a link 106 and the first properties can include a link geometry and a link mass value, and the second type of component can be an actuator 108 and the second properties can include a torque or force value, a type identifier, an actuator geometry, a velocity value, and an actuator mass value. Another actuator property associated with the at least one actuator can identify an actuator size of a plurality of predefined actuator sizes.

The process 700 may continue at block 708 by the computer system 802 generating a simulated representation 118 (FIG. 1) of the simulated robotic manipulator. The simulated representation 118 is generated using the set of components 110 and the geometric, kinematic, and/or dynamic information 114.

The process 700 may continue at block 710 by the computer system 802 providing the simulated representation 118 of the simulated robotic manipulator for presentation via a robotic design user interface 122 (FIG. 1). The computer system 802 can provide the robotic design user interface 122 for presentation at a user device. The computer system 802 can generate a work envelope 642 (FIG. 6) corresponding to the simulated robotic manipulator based on the geometric, kinematic, and/or dynamic information 114 and provide the work envelope 642 for presentation via a display portion of the robotic design user interface 122. In addition, the computer system 802 can determine a set of task waypoints 540 (FIG. 5) based on the geometric, kinematic, and/or dynamic information 114, provide the set of task waypoints 540 for presentation via the display portion of the robotic design user interface 122, and cause the simulated representation 118 of the simulated robotic manipulator to simulate movements between individual task waypoints of the set of task waypoints 540. The set of task waypoints 540 may be determined based on the task information. The computer system 802 can iteratively evaluate the simulated robotic manipulator in accordance with at least one of cost optimization, energy consumption optimization, work envelope optimization, actuator torque optimization, safety optimization, or task rate optimization. The computer system 802 can generate a bill of materials for constructing a real robotic manipulator based on the geometric, kinematic, and/or dynamic information 114 and the set of components 110.

The computer system 802 may receive modification instructions for modifying a property of the one or more properties. For instance, the computer system 802 may add a module including a first component and a second component corresponding to the first component to the simulated robotic manipulator based on a user selection of a component addition user interface element and update the simulated representation 118 of the simulated robotic manipulator to include the module. The computer system 802 may additionally or alternatively receive updated geometric, kinematic, and/or dynamic information or task information via the robotic design user interface 122, update the simulated representation 118 of the simulated robotic manipulator based on the updated geometric, kinematic, and/or dynamic information or task information, and provide the updated simulated representation of the simulated robotic manipulator for presentation via the display portion of the robotic design user interface 122. The computer system 802 can also provide the updated geometric, kinematic, and/or dynamic information for presentation at the display.

Figure 8:
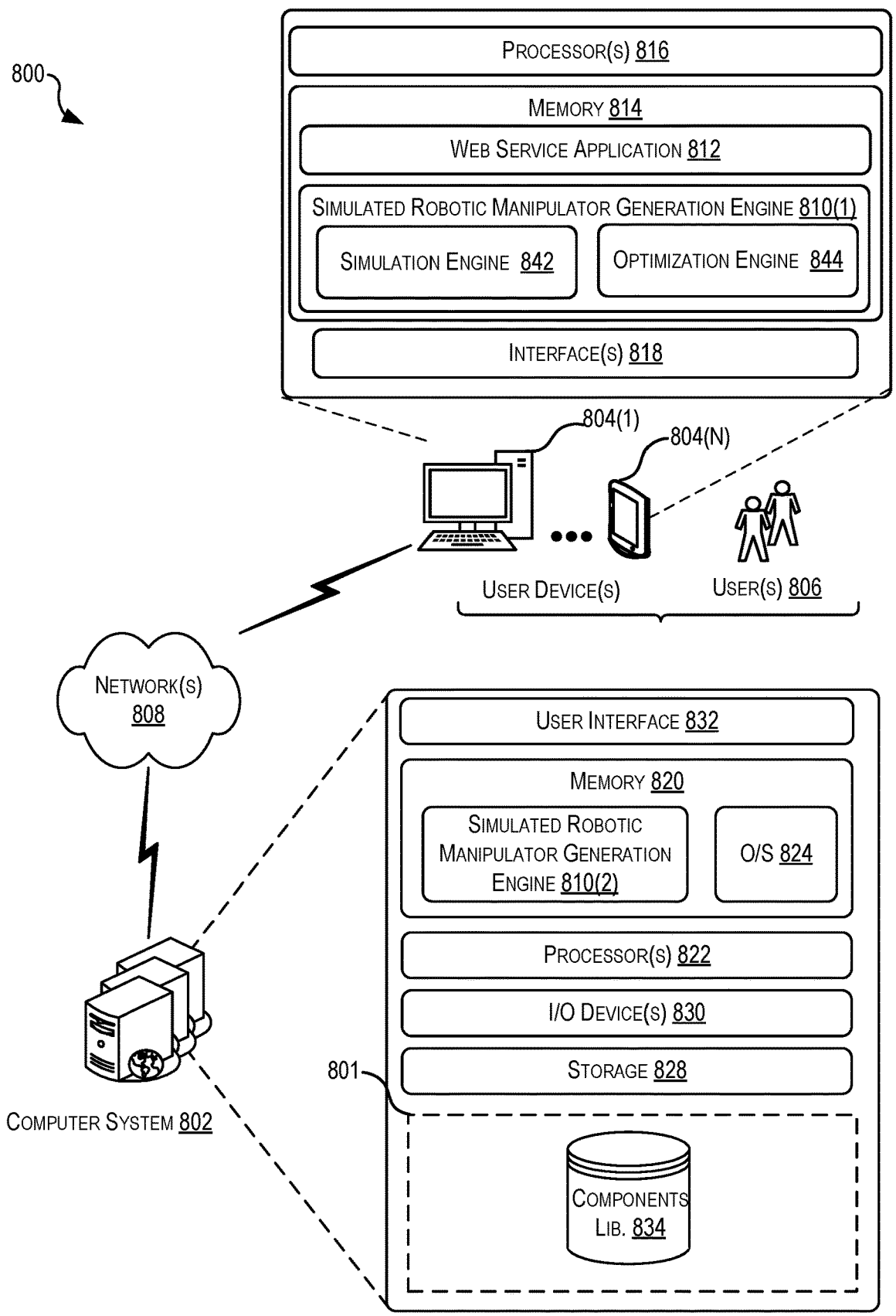
FIG. 8 illustrates an example schematic architecture for implementing techniques relating to generating a task-specific simulated robotic manipulator, according to at least one example.

FIG. 8 illustrates an example schematic architecture 800 for implementing techniques relating to generating a task-specific simulated representation (e.g., simulated representation 118 in FIG. 1), according to at least one example. The architecture 800 may include a computer system 802 (e.g., the computer system described herein) in communication with one or more user devices 804(1)-804(N) via one or more networks 808 (hereinafter, "the network 808").

The user device 804 may be operable by one or more users 806 to interact with the computer system 802. The users 806 may be administrators, developers, or others that desire to test or utilize operations of the techniques described herein. The user device 804 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 804(1) is illustrated as a desktop computer, while the user device 804(N) is illustrated as an example of a handheld mobile device.

The user device 804 may include a memory 814 and processor(s) 816. In the memory 814 may be stored program instructions that are loadable and executable on the processor(s) 816, as well as data generated during the execution of these programs. Depending on the configuration and type of user device 804, the memory 814 may be volatile (such as random access memory ("RAM")) and/or non-volatile (such as read-only memory (ROM), flash memory, etc.).

In some examples, the memory 814 may include a web service application 812 and a version of a simulated robotic manipulator generation engine 810 (e.g., 810(1)). The web service application 812 and/or the simulated robotic manipulator generation engine 810(1) may allow the user 806 to interact with the computer system 802 via the network 808. The user device 804 may also include one or more interfaces 818 to enable communication with other devices, systems, and the like. The simulated robotic manipulator generation engine 810, whether embodied in the user device 804 or the computer system 802, may be configured to perform the techniques described herein.

The simulated robotic manipulator generation engine 810 includes a simulation engine 842 and an optimization engine 844. In an example, the simulated robotic manipulator generation engine 810 can include any other suitable engines, modules, models, and the like.

The simulation engine 842 can manage various tasks related to the generation of the simulated representation of the simulated robotic manipulator. In an example, the simulation engine 842 may ingest data, may transmit or otherwise share output from simulation, and any other suitable tasks. In an example, the simulation engine 842 may take task requirements and task constraints as input, and may output the simulated representation of the simulated robotic manipulator. The simulation engine 842 may be configured to generate simulated representations, modify simulated representations based on updated data, and/or perform other suitable tasks with respect to the simulated robotic manipulators described herein.

The optimization engine 844 can include one or more computer services for optimizing the simulated representation of the simulated robotic manipulator generated by the simulation engine 842. In an example, the optimization engine 844 may include an optimization function configured to optimize an optimization parameter associated with the simulated representation of the simulated robotic manipulator. The optimization engine 844 may ingest simulated representations, may apply the optimization function to the simulated representations, may determine adjustments for the simulated representations to optimize the optimization parameter, and any other suitable tasks.

Turning now to the details of the computer system 802, the computer system 802 may include one or more computer system computers, perhaps arranged in a cluster of servers or as a server farm, and may host web service applications. The function of the computer system 802 may be implemented a cloud-based environment such that individual components of the computer system 802 are virtual resources in a distributed environment.

The computer system 802 may include at least one memory 820 and one or more processing units (or processor(s)) 822. The processor 822 may be implemented as appropriate in hardware, computer-executable instructions, software, firmware, or combinations thereof. Computer-executable instruction, software, or firmware implementations of the processor 822 may include computer-executable or machine-executable instructions written in any suitable programming language to perform the various functions described. The memory 820 may include more than one memory and may be distributed throughout the computer system 802. The memory 820 may store program instructions that are loadable and executable on the processor(s) 822, as well as data generated during the execution of these programs. Depending on the configuration and type of memory including the computer system 802, the memory 820 may be volatile (such as RAM and/or non-volatile (such as read-only memory ("ROM"), flash memory, or other memory)). The memory 820 may include an operating system 824 and one or more application programs, modules, or services for implementing the features disclosed herein including at least a version of the simulated robotic manipulator generation engine 810 (e.g., 810(2)). For example, the simulated robotic manipulator generation engine 810(2) may perform the functionality described herein.

The computer system 802 may also include additional storage 828, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 828, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 802 and/or part of the user device 804.

The computer system 802 may also include input/output (I/O) device(s) and/or ports 830, such as for enabling connection with a keyboard, a mouse, a pen, a voice input device, a touch input device, a display, speakers, a printer, or other I/O device.

In some examples, the computer system 802 may also include one or more user interface(s) 832. The user interface 832 may be utilized by an operator, curator, or other authorized user to access portions of the computer system 802. In some examples, the user interface 832 may include a graphical user interface, voice interfaces, web-based applications, programmatic interfaces such as APIs, or other user interface configurations.

The computer system 802 may also include a data store 801. In some examples, the data store 801 may include one or more databases, data structures, or the like for storing and/or retaining information associated with the computer system 802 and which, in some examples, may be accessible by the user devices 804. The simulated robotic manipulator generation engine 810 is communicatively coupled (e.g., via a wired connection or a wireless connection) to the data store 801. The data store 801 includes a components library 834. In an example, the data store 801 can include any other suitable data, databases, libraries, and the like.

Figure 9:
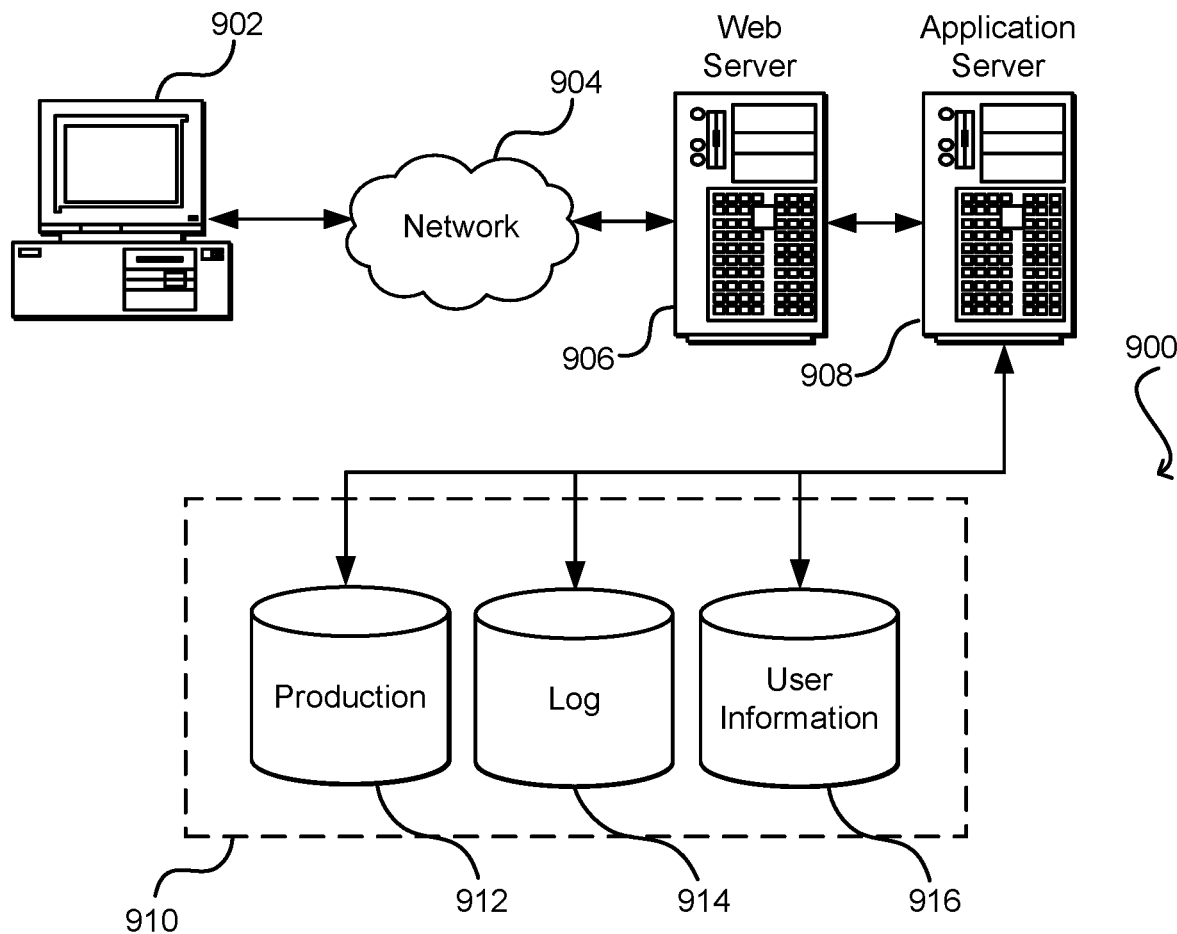
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media comprising computer-executable instructions that, when executed by one or more computer systems, cause the one or more computer systems to perform operations comprising:
   providing a robotic design user interface for presentation at a user device;
   receiving, via the robotic design user interface, task requirement information that defines one or more robotic manipulation tasks and task constraint information that defines one or more constraints corresponding to the one or more robotic manipulation tasks;
   selecting, from a plurality of predefined components and using the task requirement information and the task constraint information, a set of predefined components for assembling a simulated robotic manipulator to perform the one more robotic manipulation tasks in accordance with the one or more constraints;
   generating information corresponding to the set of predefined components of the simulated robotic manipulator, the information comprising at least one of geometric, kinematic, or dynamic information that identifies, for individual predefined components of the set of predefined components, one or more properties;

generating a simulated representation of the simulated robotic manipulator using the set of predefined components and the generated information;
providing the simulated representation for presentation at a display portion of the robotic design user interface at the user device.

2. The one or more non-transitory computer-readable media of claim 1, wherein the set of predefined components comprises at least one link and at least one actuator, wherein a first property of the one or more properties is associated with the at least one actuator and identifies an actuator size of a plurality of predefined actuator sizes.

3. The one or more non-transitory computer-readable media of claim 1, wherein the plurality of predefined components comprise a set of actuators of varying sizes and types.

4. The one or more non-transitory computer-readable media of claim 1, wherein selecting the set of predefined components comprises receiving the set of predefined components via user selection.

5. The one or more non-transitory computer-readable media of claim 1, wherein the task requirement information identifies at least one of a maximum reach value or a manipulation task, wherein the task constraint information identifies at least one of a payload weight value or an acceleration value.

6. A computer-implemented method, comprising:
receiving, via a robotic design user interface, at least one of task information or constraint information;
selecting a set of components for a simulated robotic manipulator from a plurality of components in accordance with at least one of the task information or the constraint information;
generating information corresponding to the set of components, the information comprising at least one of geometric, kinematic, or dynamic information that identifies, for individual components of the set of components, one or more properties;
generating a simulated representation of the simulated robotic manipulator based at least in part on set of components and the generated information; and
providing, for presentation via a display portion of the robotic design user interface, the simulated representation of the simulated robotic manipulator.

7. The computer-implemented method of claim 6, wherein the one or more properties comprises first properties for a first type of component of the set of components and second properties for a second type of component of the set of components, the first type of component being distinct from the second type of component.

8. The computer-implemented method of claim 7, wherein the first type of component comprises a link and the first properties comprise a link geometry and a link mass value, wherein the second type of component comprises an actuator and the second properties comprise a torque value, a force value, a type identifier, an actuator geometry, a velocity value, and an actuator mass value.

9. The computer-implemented method of claim 6, further comprising:
generating a work envelope corresponding to the simulated robotic manipulator based at least in part on the generated information, the work envelope corresponding to a reachability envelope or a manipulability envelope of the simulated robotic manipulator; and
providing, for presentation via the display portion of the robotic design user interface, the work envelope.

10. The computer-implemented method of claim 6, further comprising:
receiving, via the robotic design user interface, updated information comprising at least one of updated geometric, updated kinematic, or updated dynamic information;
updating the simulated representation of the simulated robotic manipulator based at least in part on the updated information; and
providing the updated simulated representation of the simulated robotic manipulator for presentation via the display portion of the robotic design user interface.

11. The computer-implemented method of claim 6, further comprising:
receiving, via the robotic design user interface, updated task information;
updating the simulated representation of the simulated robotic manipulator based at least in part on the updated task information; and
providing the updated simulated representation of the simulated robotic manipulator for presentation via the display portion of the robotic design user interface.

12. The computer-implemented method of claim 6, further comprising:
determining a set of task waypoints based at least in part on the generated information;
providing the set of task waypoints for presentation via the display portion of the robotic design user interface; and
causing the simulated representation of the simulated robotic manipulator to simulate movements between individual task waypoints of the set of task waypoints.

13. The computer-implemented method of claim 12, wherein determining the set of task waypoints comprises determining the set of task waypoints based at least in part on the task information.

14. The computer-implemented method of claim 6, wherein selecting the set of components for the simulated robotic manipulator comprises:
selecting a standard simulated robotic manipulator comprising the set of components from among a set of standard simulated robotic manipulators;
selecting a standard module included in the set of components from among a set of standard modules; or
selecting a standard component included in the set of components from among a set of standard components.

15. The computer-implemented method of claim 6, further comprising:
adding a module including a first component and a second component corresponding to the first component to the simulated robotic manipulator based at least in part on a user selection of a component addition user interface element; and
updating the simulated representation of the simulated robotic manipulator to include the module.

16. The computer-implemented method of claim 6, further comprising iteratively evaluating the simulated robotic manipulator in accordance with at least one of cost optimization, energy consumption optimization, work envelope optimization, actuator torque optimization, safety optimization, or task rate optimization.

17. The computer-implemented method of claim 6, further comprising generating a bill of materials for constructing a real robotic manipulator based at least in part on the generated information and the set of components.

18. A system, comprising:

one or more memories configured to store computer-executable instructions;

one or more processors configured to access the one or more memories and execute the computer-executable instructions to at least:

provide a simulated representation of a simulated robotic manipulator for presentation at a display, the simulated robotic manipulator comprising at least one predefined actuator and at least one link connected to the at least one predefined actuator, information describing one or more properties of the simulated robotic manipulator, the information comprising at least one of geometric, kinematic, or dynamic information;

receive modification instructions for modifying a property of the one or more properties;

updating the information based at least in part on the modified property; and provide the updated information for presentation at the display.

19. The system of claim 18, wherein the one or more processors are configured to access the one or more memories and execute additional computer-executable instructions to at least:

update the simulated representation based at least in part on the updated information; and provide the updated simulated representation for presentation at the display.

20. The system of claim 18, further comprising a component database that is accessible by the one or more processors and configured to store a set of predefined robotic components including the at least one predefined actuator and the link.

* * * * *